(12) United States Patent
Gao et al.

(10) Patent No.: US 8,835,549 B2
(45) Date of Patent: Sep. 16, 2014

(54) COATING COMPOSITION FOR ENGINE PARTS AND ENGINE PART COMPRISING IT

(75) Inventors: Yunzhi Gao, Kumagaya (JP); Junichi Takahashi, Kumagaya (JP); Ayako Fujie, Chigasaki (JP); Ryo Hirabayashi, Chigasaki (JP)

(73) Assignee: Kabushiki Kaisha Riken, Tokyo (JP)

( * ) Notice: Subject to any disclaimer, the term of this patent is extended or adjusted under 35 U.S.C. 154(b) by 182 days.

(21) Appl. No.: 13/514,793

(22) PCT Filed: Dec. 9, 2010

(86) PCT No.: PCT/JP2010/072147
§ 371 (c)(1),
(2), (4) Date: Jun. 8, 2012

(87) PCT Pub. No.: WO2011/071117
PCT Pub. Date: Jun. 16, 2011

(65) Prior Publication Data
US 2012/0245274 A1    Sep. 27, 2012

(30) Foreign Application Priority Data
Dec. 10, 2009    (JP) .................................. 2009-280910

(51) Int. Cl.
*C09D 183/06* (2006.01)
*C08L 83/06* (2006.01)

(52) U.S. Cl.
USPC .................... 524/506; 427/407.1; 427/255.14

(58) Field of Classification Search
USPC ........................... 524/506; 427/407.1, 255.14
See application file for complete search history.

(56) References Cited

U.S. PATENT DOCUMENTS

| | | | |
|---|---|---|---|
| 6,582,620 B2 * | 6/2003 | Miyadai et al. | 252/8.62 |
| 2005/0269787 A1 | 12/2005 | Muramatsu et al. | |
| 2007/0004598 A1 | 1/2007 | Maeda | |
| 2012/0295503 A1 * | 11/2012 | Uesugi et al. | 442/80 |

FOREIGN PATENT DOCUMENTS

| | | |
|---|---|---|
| JP | 7-246365 A | 9/1995 |
| JP | 10-157013 A | 6/1998 |
| JP | 11-100797 A | 4/1999 |
| JP | 11-124419 A | 5/1999 |
| JP | 2000-27995 A | 1/2000 |
| JP | 2001-89625 A | 4/2001 |
| JP | 2002-212422 A | 7/2002 |
| JP | 2004-68815 A | 3/2004 |
| JP | 2004-149622 A | 5/2004 |
| JP | 2006-35011 A | 2/2006 |
| JP | 2006-45463 A | 2/2006 |
| JP | 2009-36035 A | 2/2009 |
| JP | 2010-18779 A | 1/2010 |

OTHER PUBLICATIONS

International Search Report issued in PCT/JP2010/072147, mailed on Mar. 8, 2011.
Written Opinion of the International Searching Authority issued in PCT/JP2010/072147, mailed on Mar. 8, 2011.

* cited by examiner

*Primary Examiner* — Robert D. Harlan
(74) *Attorney, Agent, or Firm* — Birch, Stewart, Kolasch & Birch, LLP

(57) ABSTRACT

An engine part coated with an engine-parts-coating composition comprising (i) at least one of a polyfluoroalkyl group and a polyfluoropolyether group, (ii) an organopolysiloxane group, and (iii) an alkoxysilyl group.

5 Claims, 2 Drawing Sheets

COATING COMPOSITION FOR ENGINE PARTS AND ENGINE PART COMPRISING IT

FIELD OF THE INVENTION

The present invention relates to a coating composition for engine parts and an engine part comprising it, particularly to a coating composition for engine parts effective for preventing the adhesion and accumulation of oil sludge formed by the deterioration of engine oil to engine parts, and an engine part such as an oil control ring, etc. comprising it.

BACKGROUND OF THE INVENTION

In internal engines such as automobile engines, engine oil and oil additives are deteriorated or degraded by oxidation and heat depending on the engine operation state. The oxidized oil tends to absorb moisture from ambient air, and oil decomposed by heat is thermally polymerized by engine heat to have larger molecular weights. It is known that oil is deteriorated by the inclusion of moisture, dilution with a fuel, the nitration of unburned fuel, etc. The oil is finally turned to muddy deposit called "oil sludge," which is adhered as solid deposit to engine parts. The solid deposit acts to wear parts and clog oil paths, further causing parts to stick to each other at worst, crippling their functions.

FIG. 3 shows a coil-spring-loaded oil control ring 100 received in a ring groove 91 of a piston 9. A circular oil ring body 200 having a gap is constituted by a pair of axially arranged upper and lower rails 110, 110, and a web 120 connecting them. The coil-spring-loaded oil control ring 100 comprises the above oil ring body 200, and a coil expander 300 pushing the oil ring body 200 radially outward, having a so-called oil-controlling function of keeping a proper amount of oil (within its minimum necessity) on a cylinder wall. In such oil control ring 100, oil sludge is adhered to and accumulated on a surface of the coil expander 300 and an inner circumferential groove 130 of the oil ring body 200, and further to oil holes 140 and an outer circumferential groove 150, likely clogging the oil holes 140. The clogged oil holes 140 fail to exhibit an oil-controlling function, resulting in increased oil consumption. Also, when the oil sludge is adhered and accumulated in coil pitch of the coil expander 300, adjacent coil wires likely stick to each other, losing tension. Particularly, when the coil expander 300 has low tension to improve fuel efficiency, the coil expander 300 becomes unmovable by oil sludge adhered and accumulated in coil pitch, losing a force of pushing the oil ring body 200, and resulting in lower followability of the oil control ring 100 along the cylinder wall.

FIG. 4 shows an expander/segment oil control ring 500 received in a ring groove 91 of a piston 9. The expander/segment oil control ring 500 comprises a pair of circular side rails 600, 600 each having a gap, and a spacer expander 700 supporting the side rails 600, 600, an angled ear section 160 of the spacer expander 700 pushing the side rails 600 in both radial and axial directions to exhibit a sealing function between a cylinder wall surface and the upper and lower surfaces of the ring groove in addition to the above oil-controlling function. Particularly, because a small-width expander/segment oil control ring 500 with a small axial width, namely a reduced size $h_1$, has good followability to a cylinder wall surface as well as the above side-sealing function, it has low friction loss even at a low tension without increasing oil consumption. However, even this expander/segment oil control ring 500 likely suffers the adhesion and accumulation of oil sludge particularly in each space 180 between the ear section 160 and outside flat portion 170 of the spacer expander 700 and the side rails 600. Particularly when the expander/segment oil control ring 500 is made smaller in width, oil sludge tends to be accumulated, having the side rails 600 stick to the spacer expander 700. As a result, the side rails 600 have less followability to the inner surface of the cylinder, resulting in larger oil consumption.

As a method for preventing the adhesion and accumulation of oil sludge to engine parts such as oil control rings described above, pistons, etc., a oil repellent treatment has conventionally been investigated. This treatment forms an oil-repellent coating on engine part surfaces to prevent oil sludge in engine oil from adhering to them. Materials used in the oil repellent treatment are mostly fluorine-containing materials including polytetrafluoroethylene, fluoroalkyl silanes, etc. For example, JP 7-246365 A proposes a sol-gel method for forming an oil-repellent film from metal alkoxides and fluoroalkyl-substituted metal alkoxides in which part of alkoxyl groups are substituted by fluoroalkyl groups. It is known that fluoroalkyl-containing materials have water and oil repellency, and the existence of a fluoroalkyl group on the coating surface provides engine parts with oil repellency, preventing the adhesion and accumulation of oil sludge.

However, JP 10-157013 A describes that the coatings of JP 7-246365 A formed by a sol-gel method using fluoroalkyl-substituted metal alkoxides are extremely thin, not suitable for practical use. Thus, JP 10-157013 A and JP 2000-27995 A propose methods of polymerizing fluoroalkyl-substituted alkoxides before applying coating solutions to substrates, thereby providing thicker coatings.

As described above, conventionally investigated methods for preventing the sticking of engine parts due to the adhesion and accumulation of oil sludge are the volatile oil treatments of engine part surfaces. It has been found, however, that conventional oil-repellent coatings fail to sufficiently prevent the adhesion of oil sludge at high temperatures. Because engine oil exposed to high temperatures in an engine during operation has different properties and behavior from those at room temperature, oil sludge partially adhered to engine parts in a high-temperature operation is further heated in a high-speed operation, so that it is solidified on the engine part surfaces, causing the wearing of parts, the sticking of piston rings, etc. Thus, engine-parts-coating compositions capable of preventing the adhesion and accumulation of oil sludge for a long period of time, and engine parts having such coatings have not been materialized yet.

OBJECT OF THE INVENTION

Accordingly, an object of the present invention is to provide a coating composition for engine parts, which can prevent the adhesion and accumulation of oil sludge to engine parts, particularly oil control rings, for a long period of operation, and an engine part having such a coating.

SUMMARY OF THE INVENTION

As a result of intensive research in view of the above objects, the inventors have found that the use of compounds having a polyfluoroalkyl group and/or a polyfluoropolyether group and an organopolysiloxane group provides compositions capable of suppressing the adhesion and accumulation of oil sludge to the surfaces of engine parts, and easily removing (peeling) oil sludge in the form of solid deposit from the surfaces. Further, for the purpose of preventing the coatings of these compositions from peeling from the substrates, an alkoxysilyl group is added to the composition to improve the adhesion of the coating to the substrate, thereby maintaining such performance for a long period of time.

The coating composition for engine parts according to the present invention comprises specifically (i) at least one of a polyfluoroalkyl group and a polyfluoropolyether group, (ii) an organopolysiloxane group, and (iii) an alkoxysilyl group. It preferably comprises at least one of a polymerization unit derived from a compound represented by the formula (a), a polymerization unit derived from a compound represented by the formula (b), and a polymerization unit derived from a compound represented by the formula (c). It also preferably comprises a polymer (1) comprising a polymerization unit derived from a compound represented by the formula (a), a polymerization unit derived from a compound represented by the formula (b), and a polymerization unit derived from a compound represented by the formula (c). The formulae (a)-(c) are as follows:

$$CH_2=C(R^1)-C(O)O-Q^1-R^f \qquad (a),$$

$$CH_2=C(R^1)-C(O)O-Q^1-Y \qquad (b), \text{ and}$$

$$CH_2=C(R^1)-C(O)O-Q^1-Si(R^2)(R^3)(R^4) \qquad (c),$$

wherein $R^1$ is a hydrogen atom or a methyl group, $Q^1$ is a single bond or a bivalent group, $R^f$ is a polyfluoroalkyl group or a polyfluoropolyether group, Y is an organopolysiloxane group having a number-average molecular weight (Mn) of 1,000 to 60,000, and $R^2$, $R^3$ and $R^4$ are alkoxyl groups.

The number-average molecular weight (Mn) of the organopolysiloxane group is preferably 5,000-30,000, further preferably 10,000-15,000. The proportions of the compounds are preferably such that the compound having at least one of a polyfluoroalkyl group and a polyfluoropolyether group is 50-90% by mass, the compound having an organopolysiloxane group is 9-40% by mass, and the compound having an alkoxysilyl group is 1-10% by mass.

The engine part of the present invention is an engine part in an oil-sludge-containing combustion chamber, which is at least partially coated with the above coating composition, specifically, a part in a combustion chamber such as a piston, a piston ring, a cylinder liner, a cylinder head, etc.

In the engine part of the present invention, a paraffinic lubricating oil at 200° C. preferably has a contact angle of 60° or more and a sliding angle of 5° to 20° in a portion coated with the above coating composition. The sliding angle is more preferably 5° to 15°, further preferably 5° to 10°.

DESCRIPTION OF THE PREFERRED EMBODIMENTS

Figure 1:
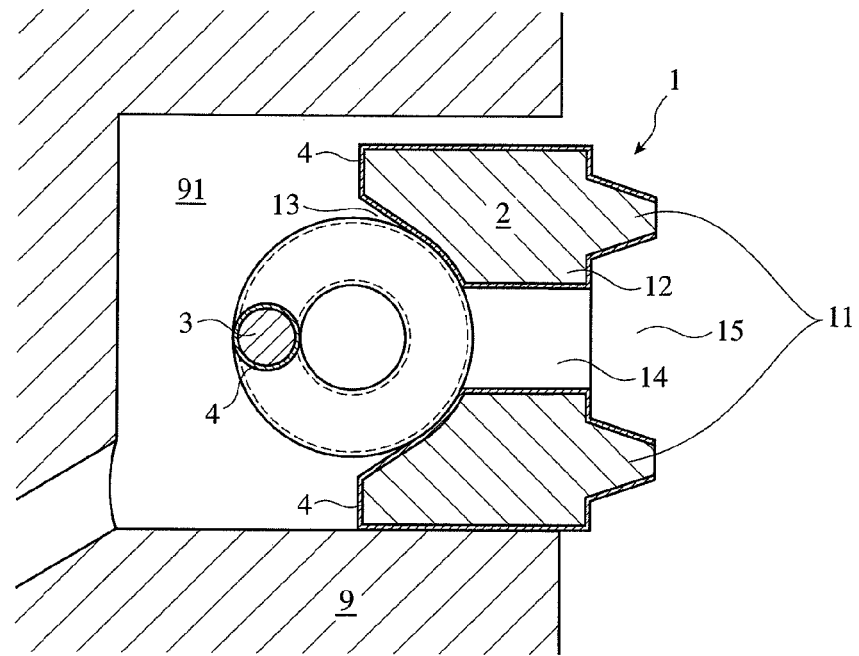
FIG. 1 is a view showing a coil-spring-loaded oil control ring coated with the engine-parts-coating composition of the present invention, which is received in a piston ring groove.

The engine-parts-coating composition and the engine part having such coating according to the present invention will be explained in detail below.

(1) Engine-Parts-Coating Composition of the Present Invention

The coating composition for engine parts (simply "engine-parts-coating composition") of the present invention comprises as indispensable components three types of functional groups comprising at least one of a polyfluoroalkyl group and a polyfluoropolyether group, an organopolysiloxane group, and an alkoxysilyl group. Though not particularly restricted as long as it comprises these functional groups, the composition preferably comprises polymers having at least one polymerization unit derived from compounds having the above functional groups, which are listed below.

A polymerizable compound having an oil-repellent polyfluoroalkyl or polyfluoropolyether group is represented by the following formula (a):

$$CH_2=C(R^1)-C(O)O-Q^1-R^f \qquad (a),$$

wherein $R^1$ is a hydrogen atom or a methyl group, $Q^1$ is a single bond or a bivalent group, and $R^f$ is a polyfluoroalkyl group or a polyfluoropolyether group.

In the formula (a), $R^1$, which is a hydrogen atom or a methyl group, is preferably a methyl group, because the methyl group has an excellent function to prevent the adhesion and accumulation of oil sludge. $Q^1$, which may be properly selected from a single bond and a bivalent group, is preferably a single bond, or a bivalent group which is an alkylene group having 1-6 carbon atoms, an amino group, a sulfonyl group, or their combination. Preferable among them is the alkylene group having 1-6 carbon atoms.

The $R^f$ group is a polyfluoroalkyl group or a polyfluoropolyether group. The polyfluoroalkyl group is a partially or completely fluorinated alkyl group, in which two to all hydrogen atoms in the alkyl group are substituted by fluorine atoms. The polyfluoroalkyl group represented by $R^f$ may have a linear or branched chain structure. For example, alkyl groups having linear or branched chain structures such as methyl, ethyl, propyl, butyl, pentyl, hexyl, etc., which are partially or completely fluorinated, are included. The polyfluoroalkyl groups having branched chain structures include completely fluorinated alkyl groups (such as an isopropyl group, a 3-methylbutyl group, etc.). The polyfluoropolyether group is a group obtained by introducing ether oxygen atoms into one or more carbon-carbon bonds in the above polyfluoroalkyl group.

Though the $R^f$ group having 8 or more carbon atoms would not pose any problems in performance, the $R^f$ group more preferably has 6 or less carbon atoms, taking influence on humans and environment into consideration. Though the $R^f$ group may have a linear or branched chain structure, the $R^f$ group preferably has a linear chain structure to increase its orientation. For the same reason, if the $R^f$ group has a branched chain structure, the branch preferably exists at an end of the $R^f$ group. The $R^f$ group is preferably a polyfluoroalkyl group. The $R^f$ group is preferably a perfluoroalkyl group ($R^F$ group) which is substantially completely fluorinated, more preferably a linear $R^F$ group.

Particularly preferable among the compounds represented by the formula (a) is a compound represented by the following formula (a1):

$$CH_2=C(R^1)-C(O)O-(CH_2)n-R^f \qquad (a1),$$

wherein $R^1$ is a hydrogen atom or a methyl group, $R^f$ is a polyfluoroalkyl group, and n is an integer of 1-6.

The polymerizable compound having an organopolysiloxane group is represented by the following formula (b):

$$CH_2=C(R^1)-C(O)O-Q^1-Y \qquad (b),$$

wherein $R^1$ is a hydrogen atom or a methyl group, $Q^1$ is a single bond or a bivalent group, and Y is an organopolysiloxane group having a number-average molecular weight (Mn) of 1,000 to 60,000.

In the formula (b), too, the same $R^1$ and $Q^1$ as in the formula (a) are used. Y is an organopolysiloxane group having a number-average molecular weight (Mn) of 1,000 to 60,000, which may be a group having a repeating unit represented by —(SiO)x-, in which a hydrogen atom, an alkyl group, or a phenyl group, etc. are bonded to a silicon atom. Preferable among them is a polydimethylsiloxane group represented by —(Si(CH$_3$)$_2$O)—. The organopolysiloxane group preferably does not have a polymerizable end group. Particularly, the end group is preferably an alkyl group, an alkoxy group or a polyether group, more preferably an alkyl group. The alkyl group, the alkoxy group and the polyether group may have substituent groups.

Particularly preferable among the compound represented by the formula (b) is a compound represented by the following formula (b1):

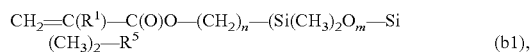

wherein $R^1$ is a hydrogen atom or a methyl group, $R^5$ is an alkyl group, m is an integer of 10-800, and n is an integer of 1-6. Among them, a compound having a polydimethylsiloxane group having a number-average molecular weight of 5,000-30,000 is preferable, and the number-average molecular weight is further preferably 10,000-15,000.

$R^5$ in the formula (b1) is an alkyl group, which may have a substituent group, but the substituent group does not have a polymerizable functional group. The substituent group in $R^5$ may be a hydroxide group, a halogen atom, a cyano group, an alkoxy group, an aryloxy group, an alkylthio group, an acyl group, a carboxylic group, a sulfonyl group, an acyloxy group, a sulfonyloxy group, a phosphonyl group, an amino group, an amide group, an alkyl group, an aryl group, a hetero-ring group, an alkoxy acyloxy group, etc. The polymerizable functional groups not included in the substituent group in $R^5$ are polymerizable unsaturated groups such as a vinyl group, an acryloyl group, a methacryloyl group, etc., epoxy groups, isocyanate groups, etc. $R^5$ is preferably an alkyl group having 1-5 carbon atoms.

The polymerizable compound having an alkoxysilyl group is represented by the following formula (c):

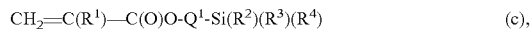

wherein $R^1$ is a hydrogen atom or a methyl group, $Q^1$ is a single bond or a bivalent group, and $R^2$, $R^3$ and $R^4$ are alkoxy groups.

In the formula (c), too, the same $R^1$ and $Q^1$ as in the formula (a) are used. Each of $R^2$, $R^3$ and $R^4$ is preferably an alkoxy group having 1-3 carbon atoms. The $R^2$, $R^3$ and $R^4$ may be the same alkoxy group or different alkoxy groups.

Particularly preferable among the compounds represented by the formula (c) is a compound represented by the following formula (c1):

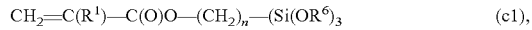

wherein $R^1$ is a hydrogen atom or a methyl group, $R^6$ is an alkyl group having 1-3 carbon atoms, and n is an integer of 1-6.

As described above, effective components in the engine-parts-coating composition of the present invention may be a mixture comprising three types of compounds as indispensable components; a compound having at least one of a polyfluoroalkyl group and a polyfluoropolyether group, a compound having an organopolysiloxane group and a compound having an alkoxysilyl group; a mixture of a polymer or copolymer of one or two of the compound represented by the formula (a), the compound represented by the formula (b) and the compound represented by the formula (c), and a polymer or copolymer of one or two of the remaining compounds; or a polymer (1) obtained by copolymerizing all of the compound represented by the formula (a), the compound represented by the formula (b) and the compound represented by the formula (c). Preferable among them is the polymer (1) obtained by copolymerizing all of the compound represented by the formula (a), the compound represented by the formula (b) and the compound represented by the formula (c), because it exhibits excellent effects of preventing the adhesion and accumulation of oil sludge for a long period of time.

With the total amount of the coating (effective) components, the above compounds, being 100, the amount of the compound having a polyfluoroalkyl group or a polyfluoropolyether group is preferably 50-90% by mass, further preferably 70-80% by mass. The amount of the compound having an organopolysiloxane group is preferably 9-40% by mass. The amount of the compound having an alkoxysilyl group is preferably 1-10% by mass. Adjusting within these ranges provides a coating with excellent adhesion to a substrate, in addition to performance to prevent the adhesion and accumulation of oil sludge and performance to remove (peel) solid deposit, resulting in excellent effects of preventing the adhesion and accumulation of oil sludge. Any of the compounds may be composed of pluralities of compounds with their total amount adjusted to the above range. When the coating component is a polymer, the polymerization unit derived from the compound represented by the formula (a) is preferably 50-90% by mass, further preferably 70-80% by mass. The polymerization unit derived from the compound represented by the formula (b) is preferably 9-40% by mass. The polymerization unit derived from the compound represented by the formula (c) is preferably 1-10% by mass.

In the polymer (1), when the number-average molecular weight of the organopolysiloxane group in the compound represented by the formula (b) is about 10,000, it is preferable that the polymerization unit derived from the compound represented by the formula (a) is 50-70% by mass, that the polymerization unit derived from the compound represented by the formula (b) is 29-40% by mass, and that the polymerization unit derived from the compound represented by the formula (c) is 1-10% by mass. Similarly, when the number-average molecular weight of the organopolysiloxane group in the compound represented by the formula (b) is about 12,000, it is preferable that the polymerization unit derived from the compound represented by the formula (a) is 70-80% by mass, that the polymerization unit derived from the compound represented by the formula (b) is 19-29% by mass, and that the polymerization unit derived from the compound represented by the formula (c) is 1-10% by mass. In the present invention, the mass ratio of each polymerization unit in the polymer is a value assuming that all materials used for polymerization are introduced into the polymerization units. Accordingly, in the polymer (1), for example, the mass ratio of the polymerization unit derived from the compound represented by the formula (a) (% by mass of this polymerization unit in all the polymerization units) is substantially a mass ratio of the compound (a) in all the polymerization compounds used for polymerization. The same is true of the mass ratios of other polymerization units in the polymer.

The engine-parts-coating composition of the present invention, which comprises at least one of a polyfluoroalkyl group and a polyfluoropolyether group, an organopolysiloxane group, and an alkoxysilyl group as indispensable components, may contain other compounds (polymerization units). The other compounds are not particularly restricted, as long as they can be blended with the above indispensable components or copolymerizable with compounds forming polymerization units in the above indispensable components. The other compounds include styrenic compounds, acrylic acid, methacrylic acid and their esters, epoxy compounds, etc. Though variable depending on their types, the other compounds (polymerization units) are preferably 50% or less by mass, more preferably 20% or less by mass, with the total amount of the coating components used being 100. A compound having a lipophilic group is preferably less than 0.1% by mass, more preferably zero, in the other compound (polymerization unit). The term "lipophilic group" used herein is a lipophilic group other than the organopolysiloxane group, for example, an aliphatic or cyclic hydrocarbon group having 1-30 carbon atoms, etc.

In the present invention, when the polymerizable compounds are copolymerized, the resultant copolymer has a number-average molecular weight of preferably 2,000-2,000,000, more preferably 10,000-500,000, further preferably 20,000-200,000. The polymerization type of the copolymer is not particularly restricted, but may be random, block or graft copolymerization, etc., though the random copolymerization is preferable. Its production method is not particularly restricted, but addition polymerization to unsaturated groups in each compound is generally used. Known addition polymerization conditions of unsaturated compounds can be properly selected. Polymerization initiators are not particularly restricted, but may be usual ones such as organic peroxides, azo compounds, persulfates, etc.

The engine-parts-coating composition of the present invention is preferably produced as a liquid composition directly by copolymerizing the above polymerizable compounds in a hydrocarbon solvent, an ester solvent or a fluorosolvent, though the polymerization solvent may differ from a solvent used for preparing a liquid composition. When the polymerizable compound is a gaseous material such as vinyl chloride, etc., it may be continuously supplied to an autoclave under pressure.

Solvents for the engine-parts-coating composition of the present invention are not particularly restricted as long as they can dissolve or disperse the coating (effective) components, but may be hydrocarbon solvents such as hexane, heptane, isooctane and octane, ester solvents such as ethyl acetate, methyl acetate and butyl acetate, or fluoro-solvents such as hydrofluorocarbon (HFC) or hydrofluoroether (HFE). Preferable among them are fluoro-solvents having excellent dryability. Specific examples of usable fluoro-solvents include without intention of restriction m-xylene hexafluoride, p-xylene hexafluoride, $CF_3CH_2CF_2CH_3$, $CF_3CH_2CF_2H$, $C_6F_{13}OCH_3$, $C_6F_{13}OC_2H_5$, $C_6F_{13}CH_2CH_3$, $C_3F_7OCH_3$, $C_3F_7OC_2H_5$, $C_6F_{13}H$, $CF_2HCF_2CH_2OCF_2CF_2H$, $CF_3CFHCFHCF_2CH_3$, $CF_3(OCF_2CF_2)_n(OCF_2)_mOCF_2H$, $C_8F_{17}OCH_3$, $C_7F_{15}OCH_3$, $C_4F_9OCH_3$, $C_4F_9OC_2H_5$, $C_4F_9CH_2CH_3$, $CF_3CH_2OCF_2CF_2H$, $CF_3CH_2OCF_2CHF_2$, and these mixtures, wherein m and n are respectively integers of 1-20. Mixtures of hydrofluoroethers $CF_3(CF_2)_3OC_2H_5$ and $(CF_3)_2CFCF_2OC_2H_5$ are available from 3M under the tradename of Novec HFE7200.

(2) Engine Parts of the Present Invention

Figure 2:
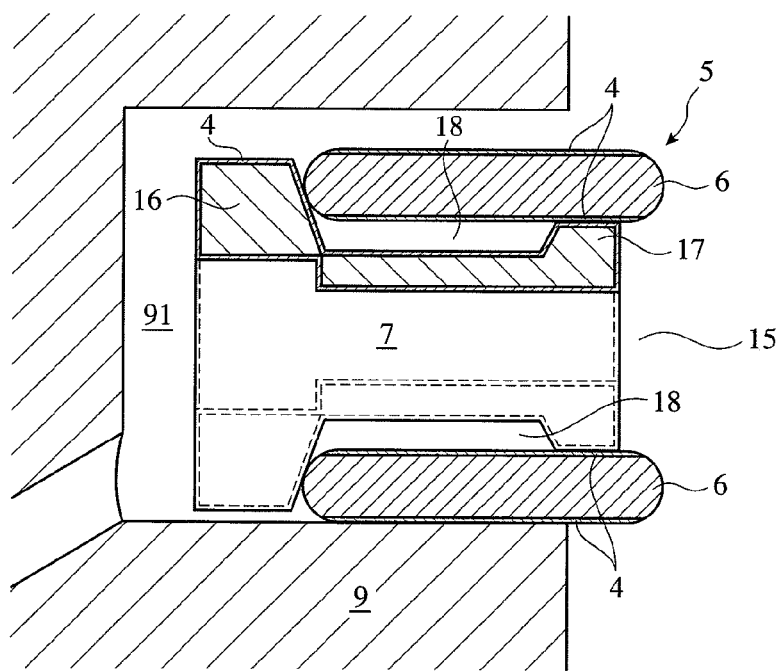
FIG. 2 is a view showing an expander/segment oil control ring coated with the engine-parts-coating composition of the present invention, which is received in a piston ring groove.
Figure 3:
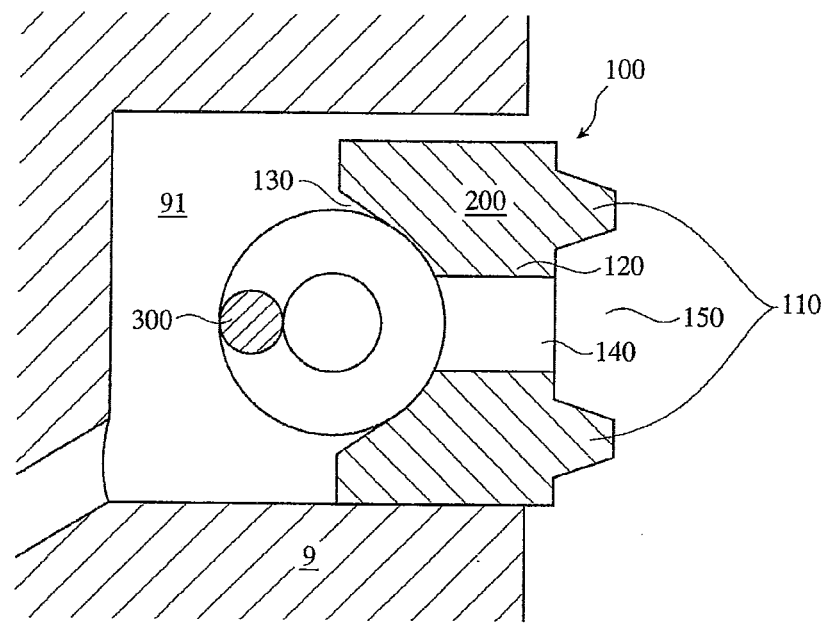
FIG. 3 is a view showing a coil-spring-loaded oil control ring received in a piston ring groove.
Figure 4:
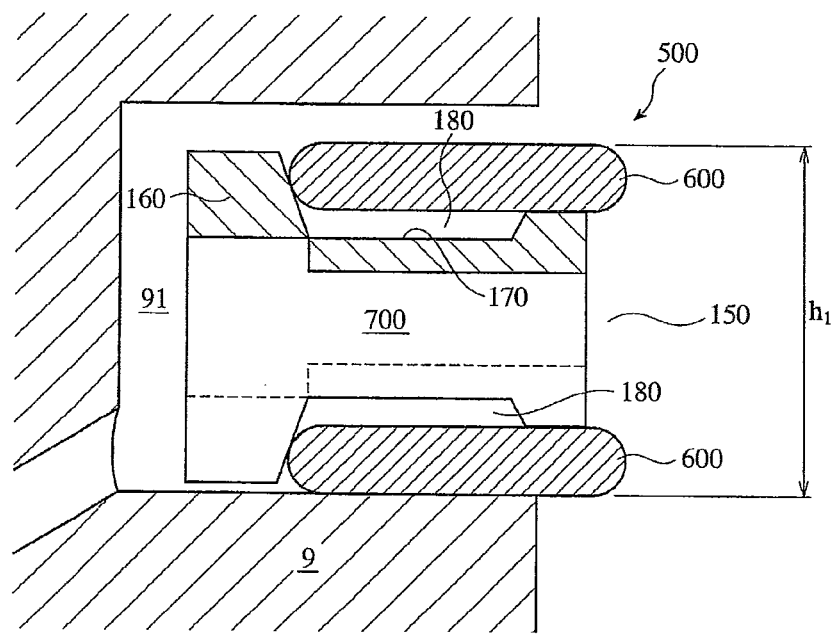
FIG. 4 is a view showing an expander/segment oil control ring received in a piston ring groove.

Engine parts to be coated with the engine-parts-coating composition of the present invention include parts in combustion chambers, such as pistons, piston rings, cylinder liners, cylinder heads, etc. For example, the coating of inner walls of cylinder heads and piston head walls with the coating composition of the present invention enables these parts to avoid the adhesion of oil sludge. Also, the formation of a coating 4 of the engine-parts-coating composition of the present invention on oil control rings such as the coil-spring-loaded oil control ring shown in FIG. 1, the expander/segment oil control ring shown in FIG. 2, etc. prevents the adhesion and accumulation of oil sludge, effective for preventing the sticking of oil control rings.

Methods for coating engine parts with the engine-parts-coating composition of the present invention are not particularly restricted, but preferably liquid phase methods such as dip coating, spray coating, etc., which are easy and inexpensive. To obtain proper viscosity depending on the coating method, the concentrations of effective components in the solution are adjusted. In the case of dip coating, for example, the total amount of effective components is preferably 0.1-10% by mass, more preferably 1-5% by mass, based on the entire solution.

The engine part of the present invention has the coating composition of the present invention coated on at least part of its surface, preferably with the contact angle and sliding angle of a paraffinic engine oil at 200° C. being 60° or more, and 5-20°, respectively, on the coated surface when measured by a method described below. The sliding angle is more preferably 5° to 15°, further preferably 5° to 10°. Engine parts whose coated surfaces have contact angles and sliding angles within the above ranges have excellent performance of preventing the adhesion and accumulation of oil sludge as well as excellent performance of removing (peeling) solid deposit for a long period of time. As a result, the adhesion and accumulation of oil sludge can be prevented, and oil sludge accumulated as solid deposit if any can be easily removed to keep the desired performance.

Measurement Method of Sliding Angle

The surface temperature of a measurement sample fixed to an aluminum-made hot stage having a heater was adjusted to 200±2° C. by measurement with a thermocouple. 30 microliters of paraffinic engine oil (paraffinic lubricating oil, "Super Oil N100" available from Nippon Oil Corporation) was dropped by a micropipette onto a surface of the measurement sample held horizontally. With the measurement sample inclined every 1°, an inclination angle at which the receding side of an oil droplet started to move was regarded as a sliding angle. Incidentally, the oil droplet was left to stand for 1 minute after 1° inclination to confirm that the receding side of the oil droplet did not move, and the measurement sample was further inclined. With respect to each sample, measurement was conducted at 5 points, and the averaged value was used as the sliding angle of the sample.

Measurement Method of Contact Angle

The surface temperature of a measurement sample fixed to an aluminum-made hot stage having a heater was adjacent to 200±2° C. by measurement with a thermocouple. 10 microliters of paraffinic engine oil (paraffinic lubricating oil, "Super Oil N100" available from Nippon Oil Corporation) was dropped by a micropipette onto the sample to form a droplet. A droplet-side angle between a tangent line drawn from the droplet at a contact point of three phases of the measurement sample, the droplet and the air and a surface of the measurement sample was regarded as a contact angle. With respect to each sample, measurement was conducted at 10 points, and the averaged value was used as the contact angle of the sample.

The present invention will be explained in further detail referring to Examples below, without intention of restricting the present invention to these Examples. "%" used in Examples below means "% by mass" unless otherwise mentioned. Used as a polymerizable compound (a) having a polyfluoroalkyl group, a polymerizable compound (b) having an organopolysiloxane group having a number-average molecular weight of about 10,000, and a polymerizable compound (c) having an alkoxysilyl group in Examples below were commercially available agents having the following structures:
(a) Abbreviation: C6FMA,
Structure: $CH_2=C(CH_3)—COO—(CH_2)_2—C_6F_{13}$.
(b) Abbreviation: PolySiMA,
Structure: $CH_2=C(CH_3)—COO—(CH_2)_3—(Si(CH_3)_2O)_n—R$, wherein R is an alkyl group.
(c) Abbreviation: SiMA,
Structure: $CH_2=C(CH_3)—COO—(CH_2)_3—Si(OCH_3)_3$.

PREPARATION OF COMPOSITIONS OF EXAMPLES 1-5

Monomers, a polymerization solvent, and a polymerization initiator in the formulation shown in Table 1 were charged into a closable vessel to cause a reaction at 70° C. for 26 hours, obtaining polymer compositions 1-5. Each polymer composition was diluted with the same solvent as the polymerization solvent to have a polymer concentration of 1% by mass, resulting in compositions 1-5. In the polymer composition 5, the organopolysiloxane group having a number-average molecular weight of about 12,000 was used. The polymerization initiator used was V-601 available from Wako Pure Chemical Industries, Ltd., and the solvent used was meta-xylene hexafluoride (m-XHF).

The polymer composition of Example 2 was measured with respect to NMR spectra of $^1H$, $^{13}C$, and $^{19}F$. A measurement sample was prepared by evaporating the polymerization solvent contained in the reacted sample by a vacuum concentrator, and then dissolving the sample in heavy benzene. In a $^1H$-NMR spectrum, there were a peak of protons in Si—$CH_3$ in (b) near 0.24 ppm, and a peak of protons in Si—$OCH_3$ in (c) near 3.50 ppm. Also, peaks of protons in —COO—$CH_2$— in (a), (b) and (c) were observed near 4.1 ppm. In a $^{13}C$-NMR spectrum, there were peaks of carbons in $S_1$—$CH_3$ in (b) near 1.3 ppm, peaks of carbons in Si—$OCH_3$ in (c) near 50 ppm, and peaks of carbons in —$CF_3$ and —$CF_2$— in 107-129 ppm. Also, peaks of carbons in —C(O)— in (a), (b), and (c) were observed near 176-177 ppm. Further, in $^{19}F$-NMR spectrum, there were peaks of F in —$CF_3$ and —$CF_2$— in (a) at –82 ppm and –114 ppm to –127 ppm.

PREPARATION OF COMPOSITIONS OF COMPARATIVE EXAMPLES 1-2

As in the compositions of Examples, monomers, a polymerization solvent and a polymerization initiator in the formulation shown in Table 1 were charged into a closable vessel, to cause a reaction at 70° C. for 26 hours to produce comparative polymer compositions 1-2. The polymer composition was diluted with the same solvent as the polymerization solvent such that the polymer concentration was 1% by mass, providing comparative compositions 1-2. The polymerization initiator used was V-601 available from Wako Pure Chemical Industries, Ltd., and the solvent used was meta-xylene hexafluoride (m-XHF) or toluene (Comparative Example 2).

Used as a substrate to be coated with the composition was a flat plate (arithmetic-average roughness Ra: 10 nm or less) made of stainless steel (SUS304) having an oxidation surface layer formed by a heat treatment at 500° C. in the air. The substrate was immersed in each of the compositions 1-5 and the comparative compositions 1 and 2 for 30 seconds, and subjected to a heat treatment at 120° C. for 1 hour in the air in an electric furnace to form a coating on the substrate surface, thereby providing a measurement sample (Examples 1-5 and Comparative Examples 1-2). The coating was as thick as about 0.8 μm. A flat stainless steel (SUS304) plate was subjected only to a heat treatment at 500° C. in the air without having a coating on the surface in Comparative Example 3.

TABLE 1

| | | PolySiMA | | | | |
| No. | C6FMA | $Mn^{(1)}$ of about 10,000 | $Mn^{(1)}$ of about 12,000 | SiMA | V-601 | m-XHF or Toluene |
|---|---|---|---|---|---|---|
| Example 1 | 85 | 10 | — | 5 | 1 | 400 |
| Example 2 | 75 | 20 | — | 5 | 1 | 400 |
| Example 3 | 65 | 30 | — | 5 | 1 | 400 |
| Example 4 | 55 | 40 | — | 5 | 1 | 400 |
| Example 5 | 75 | — | 20 | 5 | 1 | 400 |
| Comparative Example 1 | 95 | — | — | 5 | 1 | 400 |
| Comparative Example 2 | — | 95 | — | 5 | 1 | 400 (Toluene) |

Note:
[1]Number-average molecular weight.

Each measurement sample was measured with respect to a sliding angle and a contact angle at 200° C. by the above methods. The results are shown in Table 2. The measurement of the sliding angle and the contact angle used an automated contact angle meter (DM500 available from Kyowa Interface Science Co., Ltd.). In Comparative Example 3, the dropped paraffinic engine oil spread on the substrate, failing to form a droplet. Accordingly, the sliding angle and the contact angle were not measured.

Oil Sludge Adhesion Test

Sludge-containing deteriorated oil used in engine operation was heated to 80° C. Each measurement sample was immersed in the deteriorated oil for 1 minute, and then heat-treated in an electric furnace set at 200° C. for 4 minutes. After repeating immersion in the deteriorated oil and heat treatment at 200° C. 370 times, a surface of the measurement sample was observed to evaluate the adhesion of oil sludge. Also, the measurement sample was immersed in a hydrocarbon detergent (NS Clean available from Japan Energy Corporation), and subjected to ultrasonic irradiation for 5 minutes. Thereafter, a surface of the measurement sample was observed to evaluate the peeling (removal) of oil sludge. With respect to each measurement sample, the adhesion and peeling (removal) of oil sludge was evaluated. The results are shown in Table 2. An area ratio of oil-sludge-adhered portions of each measurement sample to the entire area (100) of the measurement sample was determined by image analysis, and the adhesion of oil sludge was evaluated based on this area ratio by standards described below. An area ratio of oil-sludge-adhered portions of each measurement sample after ultrasonic irradiation to the entire area (100) of the oil-sludge-adhered portions before ultrasonic irradiation was determined, and the peeling (removal) of oil sludge was evaluated based on this area ratio by standards described below.

Adhesion
Excellent: Substantially no adhesion of oil sludge,
Good: More than 0% and less than 20%,
Fair: 20% or more and 90% or less, Poor: More than 90% (adhered to substantially entire surface).
Peeling
Excellent: 0% (100% peeled),
Good: More than 0% and less than 5%,
Fair: 5% or more and 90% or less,
Poor: More than 90% (substantially no peeling).

TABLE 2

| No. | Sliding Angle (200° C.) | Contact Angle (200° C.) | Evaluation Results | |
|---|---|---|---|---|
| | | | Adhesion | Peeling |
| Example 1 | 20 | 70 | Excellent | Fair* |
| Example 2 | 18 | 68 | Excellent | Fair* |
| Example 3 | 14 | 67 | Excellent | Good* |
| Example 4 | 11 | 64 | Excellent | Good* |
| Example 5 | 6 | 73 | Excellent | Excellent* |
| Comparative Example 1 | 17 | 75 | Poor | Fair |
| Comparative Example 2 | 7 | 36 | Poor | Poor |
| Comparative Example 3 | Not Measurable | Not Measurable | Poor | Poor |

Note:
*Evaluation results after repeating immersion in the deteriorated oil and a heat treatment at 200° C. until the oil-sludge-adhered area reached about 20%.

In Comparative Example 3 without coating, and Comparative Example 2 in which a composition containing a polyorganosiloxane group and an alkoxysilyl group but not a perfluoroalkyl group was coated, oil sludge was adhered and accumulated as solid deposit on substantially the entire surface of the measurement sample. Ultrasonic irradiation in a hydrocarbon detergent substantially failed to remove the deposit from these measurement samples. In Comparative Example 1 not containing a polyorganosiloxane group but containing a perfluoroalkyl group and an alkoxysilyl group, deposit was removed more easily, but a sufficient adhesion-preventing effect was not obtained. On the other hand, in Examples 1-5, the amount of oil sludge adhered was extremely small, and an excellent adhesion-preventing effect was achieved.

In Examples 1-5, immersion in the deteriorated oil and a heat treatment at 200° C. were further repeated until the oil-sludge-adhered area reached about 20% of the entire area of measurement sample. Each measurement sample was immersed in a hydrocarbon detergent in the same manner as described above, subjected to ultrasonic irradiation, and then observed with respect to the peeling (removal) of deposit from the surface. As a result, particularly Example 5 provided excellent peeling (removal) of deposits. The performance of removing deposit increased as the sliding angle decreased.

Diesel Engine Test

By the same method as coating the measurement samples used for measuring the sliding angle, the contact angle, and the oil sludge adhesion, each of the coating compositions of Examples 1-5 as Examples 6-10 and the coating compositions of Comparative Examples 1 and 2 as Comparative Examples 4, 5 was applied to a coil-spring-loaded oil control ring. The thickness of each coating was about 0.8 μm. In Comparative Example 6, no coating was formed.

Oil Ring Body:
  Material: SUS440B,
  Surface treatment of lands: nitriding,
  Nominal diameter: 95 mm,
  Ring width: 3 mm,
  Ring thickness: 2 mm,
  Window width: 0.6 mm,
  Window length: 3 mm, and
  Pillar length: 5 mm,
Coil Expander:
  Material: SUS304,
  Wire diameter (wire diameter×coil diameter): 0.6 mm×1.2 mm,
  Outer diameter: 92.3 mm, and
  Coil pitch: 2.0 mm.

A 2.8-liter-displacement, four-cylinder diesel engine was used for the engine test. Each of the coil-spring-loaded oil control rings of Examples 6-8, and Comparative Example 6 was assembled in each piston in each cylinder. Each piston was also commonly provided with a barrel-faced top ring and a taper-faced second ring. Using the deteriorated oil as engine oil, a cyclic evaluation test was conducted by continuously repeating an operation from stop to the maximum rotation with oil and water temperatures changed from a low temperature to a high temperature. After the evaluation test for a predetermined period of time, the engine was disassembled to observe oil holes with the oil ring mounted to the piston. After the coil expander was detached from the oil ring removed from the piston, inner circumferential grooves of the oil ring body were observed. Because the adhesion and accumulation of oil sludge occur most in portions of the coil expander facing oil holes, the adhesion of oil sludge and the clogging of coil pitch in those portions were observed. The coil expander and the oil ring body were washed with acetone and fully dried. By vibrating the dried coil expander and oil ring body, substantially all adhered or accumulated deposit was removed. The collected deposit was dried at 120° C. for 60 minutes, and cooled in a desiccator to measure its weight. The results are shown in Table 3. The amount of the deposit is expressed by a relative value, with the value of Comparative Example 6 being 100. Each of the coil-spring-loaded oil control rings of Examples 9, 10 and Comparative Examples 4, 5 was also used in each cylinder of the above four-cylinder diesel engine, and evaluated and observed as in the above diesel engine test. The results are also shown in Table 3.

TABLE 3

| No. | Inner Circumferential Groove of Oil Ring Body | Coil Wire Gaps of Coil Expander Facing Oil Holes | Amount of Deposit |
|---|---|---|---|
| Example 6 | Trace Amount of Adhered Deposit | Trace Amount of Adhered Deposit, No Clogging | 15 |
| Example 7 | Trace Amount of Adhered Deposit | Trace Amount of Adhered Deposit, No Clogging | 14 |
| Example 8 | Trace Amount of Adhered Deposit | Trace Amount of Adhered Deposit, No Clogging | 9 |
| Example 9 | Trace Amount of Adhered Deposit | Trace Amount of Adhered Deposit, No Clogging | 8 |
| Example 10 | Trace Amount of Adhered Deposit | Trace Amount of Adhered Deposit, No Clogging | 3 |
| Comparative Example 4 | Trace Amount of Adhered Deposit | Trace Amount of Adhered Deposit, No Clogging | 46 |
| Comparative Example 5 | Large Amount of Accumulated Deposit | Large Amount of Accumulated Deposit, Clogging | 87 |
| Comparative Example 6 | Large Amount of Accumulated Black Deposit | Large Amount of Accumulated Deposit, Clogging | 100 |

As shown in Table 3, in Examples 6-10 and Comparative Example 4, there was a trace amount of sludge adhered in the coil pitch of the coil expander facing oil holes, though the coil pitch was not clogged. A trace amount of adhered sludge was observed in the inner circumferential groove of the oil ring. The amount of deposit in Comparative Example 4 was as much as 3-15 times those in Examples 6-10. In Comparative Example 5, sludge was accumulated in portions of the coil expander facing oil holes, so that coil pitch was clogged. Also, a relatively large amount of deposit was observed in the inner circumferential groove of the oil ring body. In Comparative Example 6, a large amount of black deposit was observed.

Gasoline Engine Test

As in the diesel engine test, an expander/segment oil control ring was coated with each of the coating compositions of Examples 1-5 as Examples 11-15 and the coating compositions of Comparative Examples 1 and 2 as Comparative Examples 7 and 8. In Comparative Example 9, no coating was formed. Each coating was as thick as 0.8 μm. The expander/segment oil control ring had a nominal diameter of 75 mm, a nominal overall width of 2.0 mm, and an overall thickness of 2.5 mm, the side rail made of SUS440 had a width of 0.4 mm, and the spacer expander was made of SUS304. The spacer expander was subject to a salt-bath nitriding treatment, and the side rail was subject to a radical nitriding treatment.

A gasoline engine test was conducted in the same manner as in the diesel engine test except for using a 1.5-liter-displacement, four-cylinder gasoline engine. After an evaluation test for a predetermined period of time, the engine was disassembled to observe the appearance of an oil ring mounted to a piston. With the oil ring detached from the piston, sticking between a spacer expander and side rails was investigated. The spacer expander and the side rails were then washed with acetone and fully dried. After vibrating the dried spacer expander and side rails, substantially all adhered or accumulated deposit was removed. The collected deposit was dried at 120° C. for 60 minutes, and cooled in a desiccator to measure its weight. The results are shown in Table 4. The amount of the deposit is expressed by a relative value, with the value of Comparative Example 9 being 100.

TABLE 4

| No. | Appearance of Tested Ring | Sticking of Spacer Expander to Side Rails | Amount of Deposit |
|---|---|---|---|
| Example 11 | Trace Amount of Adhered Deposit | No | 7 |
| Example 12 | Trace Amount of Adhered Deposit | No | 8 |
| Example 13 | Trace Amount of Adhered Deposit | No | 3 |
| Example 14 | Trace Amount of Adhered Deposit | No | 4 |
| Example 15 | Trace Amount of Adhered Deposit | No | ≤1 |
| Comparative Example 7 | Trace Amount of Adhered Deposit | No | 32 |
| Comparative Example 8 | Accumulated Black Deposit | Yes | 92 |
| Comparative Example 9 | Accumulated Black Deposit | Yes | 100 |

As shown in Table 4, the oil rings of Examples 11-15 clearly had smaller amounts of adhered or accumulated deposits than those of Comparative Examples 7-9, and no sticking was observed in the former. Particularly, the spacer expander of Example 15 did not have any adhesion of deposit locally. The oil ring of Comparative Example 7 did not suffer sticking, but with adhered deposit. The oil rings of Comparative Examples 8 and 9 had large amounts of accumulated black deposits, with the spacer expander sticking to the side rails.

Effects of the Invention

The coating composition for engine parts of the present invention comprises three types of functional groups, (i) at least one of a polyfluoroalkyl group and a polyfluoropolyether group, (ii) an organopolysiloxane group, and (iii) an alkoxysilyl group. This coating has excellent adhesion to a substrate, and exhibits performance of preventing the adhesion and accumulation of oil sludge and removing (peeling) solid deposit. Accordingly, the engine part of the present invention having this coating can avoid the adhesion and accumulation of oil sludge for a long period of time even in the presence of oil sludge, and even if the oil sludge is accumulated as solid deposit, it is easily removed (peeled), enabling the engine part to keep the desired performance.

What is claimed is:

1. An engine part having a coating on at least part of a surface thereof, said coating being formed by a coating composition comprising (i) at least one of a polyfluoroalkyl group and a polyfluoropolyether group, (ii) an organopolysiloxane group, and (iii) an alkoxysilyl group.

2. The engine part according to claim 1, wherein the coating of the engine part has a contact angle of 60° or more, and a sliding angle of 5° to 20° with a paraffinic engine oil at 200° C.

3. The engine part according to claim 1, wherein the coating composition comprises a polymerization unit derived from a compound represented by the formula (a), a polymerization unit derived from a compound represented by the formula (b), and a polymerization unit derived from a compound represented by the formula (c):

$$CH_2=C(R^1)-C(O)O-Q^1-R^f \quad (a),$$

$$CH_2=C(R^1)-C(O)O-Q^1-Y \quad (b), \text{ and}$$

$$CH_2=C(R^1)-C(O)O-Q^1-Si(R^2)(R^3)(R^4) \quad (c),$$

wherein $R^1$ is a hydrogen atom or a methyl group, $Q^1$ is a single bond or a bivalent group, $R^f$ is a polyfluoroalkyl group or a polyfluoropolyether group, Y is an organopolysiloxane group having a number-average molecular weight (Mn) of 1,000-60,000, and $R^2$, $R^3$ and $R^4$ are alkoxyl groups.

4. The engine part according to claim 1, wherein the coating composition comprises a polymer (1) comprising the polymerization unit derived from the compound represented by said formula (a), the polymerization unit derived from the compound represented by said formula (b), and the polymerization unit derived from the compound represented by said formula (c).

5. The engine part according to claim 3, wherein the compound represented by said formula (a) is 50-90% by mass, the compound represented by said formula (b) is 9-40% by mass, and the compound represented by said formula (c) is 1-10% by mass.

* * * * *